(12) United States Patent
Miyazawa et al.

(10) Patent No.: US 10,755,604 B2
(45) Date of Patent: Aug. 25, 2020

(54) MAP INFORMATION DISPLAY DEVICE, MAP INFORMATION DISPLAY METHOD AND PROGRAM

(71) Applicant: Sony Corporation, Tokyo (JP)

(72) Inventors: Yusuke Miyazawa, Tokyo (JP);
Fuminori Homma, Tokyo (JP);
Tomoya Narita, Kanagawa (JP);
Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/789,123

(22) Filed: Jul. 1, 2015

(65) Prior Publication Data

US 2015/0301727 A1 Oct. 22, 2015

Related U.S. Application Data

(63) Continuation of application No. 12/821,444, filed on Jun. 23, 2010, now Pat. No. 9,251,722.

(30) Foreign Application Priority Data

Jul. 3, 2009 (JP) ................................. 2009-159148

(51) Int. Cl.
*G06F 3/0488* (2013.01)
*G09B 29/10* (2006.01)
(Continued)

(52) U.S. Cl.
CPC ......... *G09B 29/106* (2013.01); *G01C 21/367* (2013.01); *G01C 21/3664* (2013.01);
(Continued)

(58) Field of Classification Search
CPC ................................................. G06F 3/04845
(Continued)

(56) References Cited

U.S. PATENT DOCUMENTS 5,552,982 A 9/1996 Jackson et al.
5,805,167 A 9/1998 Van Cruyningen
(Continued)

FOREIGN PATENT DOCUMENTS

EP 1921419 A1 5/2008
EP 2 068 235 A2 6/2009
(Continued)

OTHER PUBLICATIONS

Japanese Office Action dated Oct. 1, 2013 in connection with Japanese Application No. 2009-159148.
(Continued)

*Primary Examiner* — John F Mortell
(74) *Attorney, Agent, or Firm* — Wolf, Greenfield & Sacks, P.C.

(57) ABSTRACT

There is provided a map information display device including an operating tool detector for, on a display panel where map information MI and view image information VI are displayed, detecting a position and a pointing direction of an operating tool M in touch with an area corresponding to the map information; and a display controller for controlling display of the view image information in accordance with a view point on the map information indicated by the position of the operating tool and a line-of-sight direction on the map information indicated by the pointing direction of the operating tool.

17 Claims, 10 Drawing Sheets

(51) Int. Cl.
   *G01C 21/36* (2006.01)
   *G06F 3/0481* (2013.01)
   *G06F 3/0484* (2013.01)
   *G06T 3/60* (2006.01)
   *G09G 5/37* (2006.01)
   *G09G 5/38* (2006.01)

(52) U.S. Cl.
   CPC ....... *G01C 21/3682* (2013.01); *G06F 3/0488* (2013.01); *G06F 3/04817* (2013.01); *G06F 3/04845* (2013.01); *G06F 3/04883* (2013.01); *G06T 3/606* (2013.01); *G09G 5/37* (2013.01); *G09G 5/38* (2013.01); *G09G 2340/0492* (2013.01); *G09G 2354/00* (2013.01); *G09G 2380/10* (2013.01)

(58) Field of Classification Search
   USPC ...................................................... 340/686.1
   See application file for complete search history.

(56) References Cited

U.S. PATENT DOCUMENTS

| | | | |
|---|---|---|---|
| 5,940,079 A * | 8/1999 | Morino | G06T 15/04 345/419 |
| 6,346,938 B1 | 2/2002 | Chan et al. | |
| 7,126,579 B2 | 10/2006 | Ritter | |
| 7,246,744 B2 * | 7/2007 | O'Brien | G07C 9/00103 235/382 |
| 7,376,510 B1 | 5/2008 | Green | |
| 7,401,732 B2 * | 7/2008 | Haddad | G07C 9/00007 235/380 |
| 7,791,618 B2 * | 9/2010 | Endo | G09B 29/10 345/633 |
| 7,990,394 B2 * | 8/2011 | Vincent | G06T 17/05 345/419 |
| 7,990,455 B2 | 8/2011 | Iga | |
| 8,245,156 B2 | 8/2012 | Mouilleseaux et al. | |
| 8,316,324 B2 | 11/2012 | Boillot | |
| 8,493,408 B2 | 7/2013 | Williamson et al. | |
| 8,515,207 B2 | 8/2013 | Chau | |
| 8,549,432 B2 | 10/2013 | Warner | |
| 8,627,233 B2 | 1/2014 | Cragun et al. | |
| 8,806,336 B2 | 8/2014 | Miyazawa et al. | |
| 8,954,887 B1 * | 2/2015 | Tseng | G06F 3/04812 715/808 |
| 9,251,722 B2 | 2/2016 | Miyazawa et al. | |
| 9,322,665 B2 | 4/2016 | Blumenberg | |
| 2003/0229441 A1 | 12/2003 | Pechatnikov et al. | |
| 2005/0187015 A1 * | 8/2005 | Suzuki | A63F 13/26 463/32 |
| 2007/0268261 A1 * | 11/2007 | Lipson | G06F 1/1647 345/169 |
| 2007/0300182 A1 | 12/2007 | Bilow | |
| 2008/0045138 A1 | 2/2008 | Milic-Frayling et al. | |
| 2008/0074399 A1 | 3/2008 | Lee | |
| 2008/0291217 A1 | 11/2008 | Vincent et al. | |
| 2008/0294332 A1 | 11/2008 | Levanon et al. | |
| 2008/0313538 A1 | 12/2008 | Hudson | |
| 2009/0009522 A1 | 1/2009 | Endo et al. | |
| 2009/0101415 A1 | 4/2009 | Christensen et al. | |
| 2009/0122022 A1 | 5/2009 | Park et al. | |
| 2009/0138563 A1 * | 5/2009 | Zhu | H04W 4/14 709/206 |
| 2009/0143980 A1 * | 6/2009 | Halters | G06F 1/1626 701/533 |
| 2009/0153335 A1 * | 6/2009 | Birtcher | G06Q 10/10 340/573.1 |
| 2009/0281720 A1 | 11/2009 | Jakobson | |
| 2010/0077354 A1 | 3/2010 | Russo | |
| 2010/0079373 A1 | 4/2010 | Ohnishi | |
| 2010/0079405 A1 | 4/2010 | Bernstein | |
| 2011/0001628 A1 | 1/2011 | Miyazawa et al. | |
| 2011/0004821 A1 | 1/2011 | Miyazawa et al. | |
| 2011/0211584 A1 * | 9/2011 | Mahmoud | H04L 12/2834 370/401 |
| 2013/0325322 A1 * | 12/2013 | Blumenberg | G01C 21/367 701/420 |
| 2014/0351755 A1 | 11/2014 | Miyazawa et al. | |
| 2015/0213503 A1 * | 7/2015 | Friborg, Jr. | H04L 51/14 705/14.64 |
| 2016/0014605 A1 * | 1/2016 | Robinton | G06F 21/32 726/6 |

FOREIGN PATENT DOCUMENTS

| | | |
|---|---|---|
| GB | 2451274 B | 3/2013 |
| JP | 10-198517 A | 7/1998 |
| JP | 2001-215941 A | 8/2001 |
| JP | 2001-265523 A | 9/2001 |
| JP | 2003-106853 A | 4/2003 |
| JP | 2003-208146 A | 7/2003 |
| JP | 2004-005272 A | 1/2004 |
| JP | 2004-037125 | 2/2004 |
| JP | 2004-233333 | 8/2004 |
| JP | 2005-352619 A | 12/2005 |
| JP | 2006-230587 A | 9/2006 |
| JP | 2007-080291 A | 3/2007 |
| JP | 2007-226571 A | 9/2007 |
| JP | 2007-310888 A | 11/2007 |
| JP | 2009-025041 | 2/2009 |
| JP | 2009-093277 A | 4/2009 |
| WO | WO 2008/027154 A1 | 3/2008 |
| WO | WO 2008/078603 A1 | 7/2008 |
| WO | WO 2008/132539 A1 | 11/2008 |
| WO | WO 2009/035212 A1 | 3/2009 |

OTHER PUBLICATIONS

Japanese Office Action (Decision of Dismissal of Correction) dated May 13, 2014 in connection with Japanese Application No. 2009-159148.
Japanese Office Action (Decision of Rejection) dated May 13, 2014 in connection with Japanese Application No. 2009-159148.
Japanese Office Action dated Sep. 22, 2014 in connection with Japanese Application No. 2009-159148.
Rekimoto et al., "ToolStone: effective use of the physical manipulation vocabularies of input devices", UIST, 2000, pp. 109-117.
Rohs, Real-world interaction with camera phones. Nov. 8, 2004, In Ubiquitous Computing Systems. Second International Symposium, UCS 2004. pp. 74-89.
European Communication Pursuant to Article 94(3) EPC dated Dec. 4, 2017 for Application No. 10 166 337.5.
[No Author Listed], Google Street View—Wikipedia. Jul. 2, 2009. Retrieved on Nov. 23, 2017 from the Interntet: https://en.wikipedia.org/w/index.php?title=Google_Street_View&oldid=299900969.
European Communication pursuant to Article 94(3) EPC dated May 23, 2019 in connection with European Application No. 10 166 337.5.

* cited by examiner

MAP INFORMATION DISPLAY DEVICE, MAP INFORMATION DISPLAY METHOD AND PROGRAM

CROSS REFERENCE TO RELATED APPLICATIONS

This application is a continuation of and claims the benefit under 35 U.S.C. § 120 of U.S. patent application Ser. No. 12/821,444, entitled "MAP INFORMATION DISPLAY DEVICE, MAP INFORMATION DISPLAY METHOD AND PROGRAM", filed on Jun. 23, 2010, now U.S. Pat. No. 9,251,722, which claims the benefit under 35 U.S.C. § 119 of Japanese Patent Application 2009-159148, filed on Jul. 3, 2009, each of which is hereby incorporated by reference in its entirety.

BACKGROUND OF THE INVENTION

Field of the Invention

The present invention relates to a map information display device, a map information display method and a program.

Description of the Related Art

In recent years, with developments of map information applications such as car navigation system and mapping system, map information and map related information have been displayed and operated in various forms. For example, there is known an application for displaying map information as well as view image information in accordance with a view point indicated on the map information and a line-of-sight direction which is a direction from the view point as map related information.

[Patent Document 1] Japanese Patent Application Laid-Open No. 2004-37125

[Patent Document 2] Japanese Patent Application Laid-Open No. 2004-233333

[Patent Document 3] Japanese Patent Application Laid-Open No. 2009-25041

SUMMARY OF THE INVENTION

With this application, a user indicates a view point on the map information and indicates a line-of-sight direction on the view image information thereby to switch display of the view image information. When the line-of-sight direction is indicated on the view image information, it is difficult to know the relation between the line-of-sight direction indicated on the view image information and an actual direction on the map information. Besides, the view point on the map information and the line-of-sight direction on the view image information need to be operated separately. Therefore, with this application in related art, it is difficult to operate the map information and map related information intuitively and easily.

In light of the foregoing, it is desirable to provide a map information display device, a map information display method and a program capable of intuitively and easily operating the map information and map related information.

According to a first embodiment of the present invention, there is provided a map information display device including an operating tool detector for, on a display panel where map information and view image information are displayed, detecting a position and a pointing direction of an operating tool that is in touch with an area corresponding to the map information, and a display controller for controlling display of the view image information in accordance with a view point on the map information indicated by the position of the operating tool and a line-of-sight direction on the map information indicated by the pointing direction of the operating tool.

The operating tool detector may detect movement of the operating tool that moves in touch with the area corresponding to the map information almost simultaneously with detection of the pointing direction of the operating tool. The display controller may control the display of the view image information in accordance with the view point on the map information indicated by the position of the operating tool moved and the line-of-sight direction on the map information indicated by the pointing direction of the operating tool.

The display controller may control the display of the view image information in accordance with the line-of-sight direction on the map information that is identical with a pointing direction of the operating tool on the display panel.

The display controller may control the display of the view image information in accordance with the line-of-sight direction on the map information defined by a change amount that is obtained by multiplying a change amount in the pointing direction of the operating tool by a coefficient a, the coefficient a being larger than 1. The display controller may control display of the map information in such a manner that the map information is rotated by a change amount obtained by multiplying the change amount of the pointing direction of the operating tool by a coefficient (1−a).

The display controller may display view point information indicating the line-of-sight direction and the view point on the map information at a position corresponding to the view point on the map information.

The display controller may display view point information indicating the view point on the map information at a position corresponding to the view point on the map information. The operating tool detector may detect a first operating tool in touch with an area corresponding to the view point information on the map information and may simultaneously detect movement of a second operating tool that moves in touch with the area corresponding to the map information in such a manner as to draw an arc having a center at a detection area of the first operating tool. The display controller may control rotational display of the map information with the view point information at a rotational center in accordance with the movement of the second operating tool detected.

According to a second embodiment of the present invention, there is provided a map information display method, comprising the steps of: on a display panel where map information and view image information are displayed, detecting a position and a pointing direction of an operating tool that is in touch with an area corresponding to the map information; and controlling display of the view image information in accordance with a view point on the map information indicated by the position of the operating tool and a line-of-sight direction on the map information indicated by the pointing direction of the operating tool.

According to a third embodiment of the present invention, there is provided a program for causing a computer to execute the map information display method according to the second embodiment of the present invention.

According to the embodiments of the present invention described above, it is possible to provide a map information display device, a map information display method and a program capable of intuitively and easily operation of the map information and map related information.

DETAILED DESCRIPTION OF THE EMBODIMENT(S)

Figure 1:
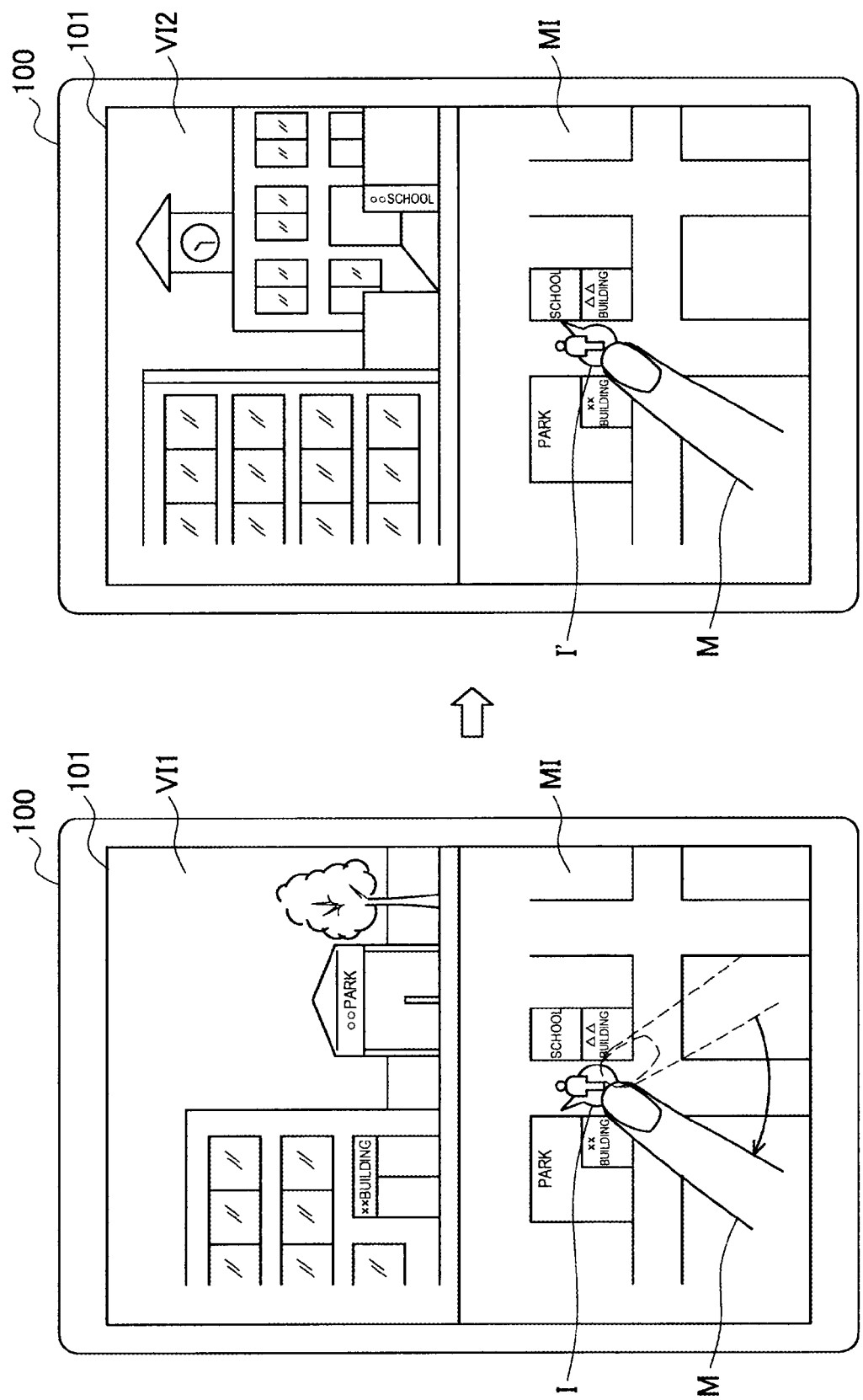
FIG. 1 is a view illustrating an overview of a map information display device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Overview of Map Information Display Device 100

FIG. 1 is a view illustrating an overview of a map information display device 100 according to an embodiment of the present invention.

The map information display device 100 according to the embodiment of the present invention detects a touch state of an operating tool M such as a finger of a user with a display panel 101. The map information display device 100 is a personal computer, a PDA, a car navigation device or the like. In the following description, the map information display device 100 has a built-in type display panel 101, however, the map information display device 100 may be connected to a display panel 101 via communication means.

The map information display device 100 detects, on the display panel 101 on which map information MI and view image information VI are displayed, a position and a pointing direction of the operating tool M in touch with an area corresponding to the map information MI. Then, the map information display device 100 controls display of the view image information VI in accordance with a line-of-sight direction on the map information MI indicated by the pointing direction of the operating tool M and the view point on the map information MI indicated by the position of the operating tool M.

For example, in FIG. 1, when the pointing direction of the operating tool M is changed on the icon I that indicates the view point on the map information MI, the line-of-sight direction indicated by the icon I' is changed, and then, view image information VI1 and view image information VI2 of the line-of-sight direction prior to and subsequent to change, respectively, are displayed. Here, the pointing direction of the operating tool M means, for example, a direction pointed out by a finger when the operating tool M is the finger.

Accordingly, the view image information VI in accordance with the line-of-sight direction and the view point indicated by the pointing direction and the position of the operating tool M on the map information MI is displayed, so that the user can operate the map information MI and the map related information such as view image information VI intuitively and easily.

2. Functional Structure of Map Information Display Device 100

Figure 2:
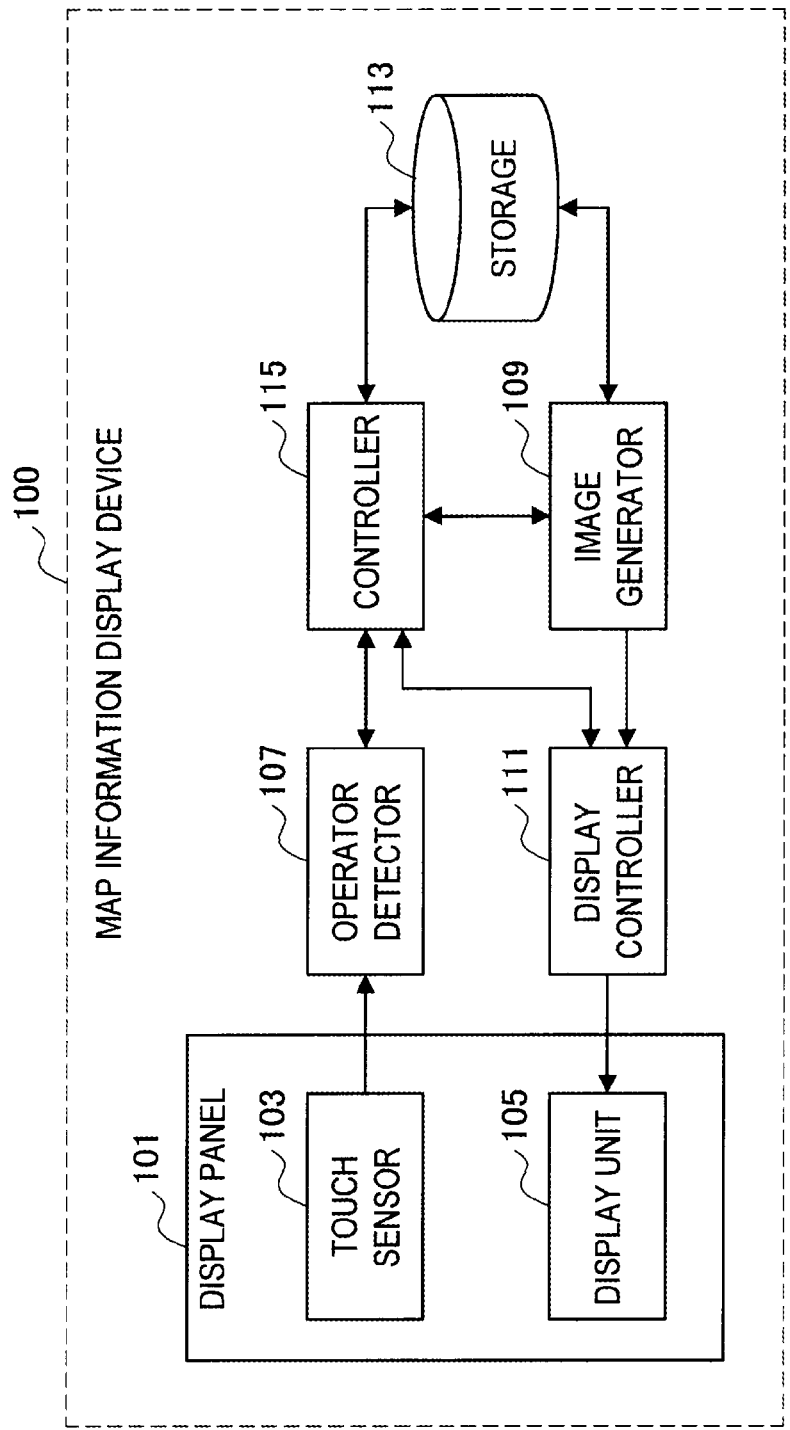
FIG. 2 is a block diagram illustrating a principal functional structure of the map information display device according to the embodiment of the present invention.

FIG. 2 is a block diagram illustrating an example of the principal functional structure of the map information display device 100 according to the embodiment of the present invention. The map information display device 100 has a display panel 101, an operating tool detector 107, an image generator 109, a display controller 111, a storage 113 and a controller 115.

The display panel 101 has a function as a touch sensor 103 and a display unit 105. The touch sensor 103 obtains a touch state of the operating tool M. The touch sensor 103 is an optical sensor, an electric capacitance sensor, a pressure sensor or the like. In the following description, it obtains the touch state of the operating tool M based on a light-receiving state of the display panel 101.

The display unit 105 displays, under control of the display controller 111, processing results of application, contents and objects and the like, and particularly displays map information MI, view image information VI and view point icon I.

The map information MI is image information such as city view, land view involving movement and longitude information. The view image information VI is image information of a picture showing landscapes of building or the like in view when seeing from a specific position (view point) on the map information MI in the particular direction (line-of-sight direction).

The view point icon I is an example of view point information, and an icon indicating the line-of-sight direction and the view point indicated on the map information MI. Here, an object is an object that forms GUI (graphical user interface), for example, an icon, a button, a thumbnail or the like.

The operating tool detector 107 detects a touch state of the operating tool M on the display panel 101 using the touch sensor 103. The operating tool detector 107 uses the light-receiving state of the display panel 101 as a basis to detect the pointing direction, a touch area, a touch position and presence or absence of touch of the operating tool M with the display panel 101. Here, the method for detecting the operating tool M by the touch sensor 103 will be described in detail later.

The position (touch position) and the pointing direction of the operating tool M are defined as the latitude, longitude and direction of the map information MI. They are used to indicate the view point and line-of-sight direction on the map information MI.

The image generator 109 generates image data of the view image information VI and the map information MI in accordance with the view point and line-of-sight direction on the map information MI. The image generator 109 reads from the storage 113 the map information MI and view image information VI in accordance with the view point and line-of-sight direction, and outputs them as image data for display on the map information display area to the display controller 111.

For example, when the latitude and longitude of the view point are La and Ln, respectively, and the line-of-sight direction is north, the map information MI containing the point indicated by the latitude La and longitude Ln and the view image information VI showing landscapes seen in the north direction from the point are output as image data.

The storage 113 stores data of objects, application programs and map information display programs and the like, particularly stores map information MI and view image information VI. The map information MI is stored associated with the latitude and longitude of the map information MI, and the view image information VI is stored associated with the latitude, longitude and direction of the map information MI. The controller 115 controls each part by execution of the map information display program, and controls the whole operation of the map information display device 100.

The display controller 111 controls the display panel 101 (display unit 105) and displays the map information MI, the view image information VI and the like. The display controller 111 controls display of the view image information VI in accordance with the view point on the map information MI indicated by the position of the operating tool M on the display panel 101 and the line-of-sight direction on the map information MI indicated by the pointing direction of the operating tool M.

Here, the map information display device 100 may have a position specifying function to detect the current position of the device, a navigation function for root search and route guide, a communication function to obtain the map information MI, the view image information VI and the like from database on the network.

Here, change in the pointing direction of the operating tool M can be discriminated from button down, button up, click, double click, touch, drag, drop, flick operations in related art, and is detected in such a manner as not to interfere with these operations.

3. Method for Detecting Operating Tool M

In the display panel 101, RGB pixels and light-receiving sensors (both not shown) are arranged in a matrix. The light-receiving sensors function as the touch sensor 103 by receiving light emitted from the display panel 101 and reflected by the operating tool M and obtaining a touch state of the operating tool M based on the light-receiving state. Then, the operating tool detector 107 generates a sensor image S by digital-processing of an output result of the touch sensor 103.

The operating tool detector 107 calculates a luminance value showing the light-receiving state corresponding to each pixel based on the sensor image S and processes the luminance value into a binary value using a predetermined threshold. In the binary processing, the luminance value of each pixel is classified into the first or second category and the sensor image S areas are divided into the first or second area A1 or A2 corresponding the respective categories. The first and second areas A1 and A2 correspond to areas of large and small luminance values, respectively, which are specified as the touch area and non-touch area of the operating tool M.

The operating tool detector 107 uses presence of the first area A1 as a basis to detect presence or absence of touch of the operating tool M with the display panel 101. Besides, the operating tool detector 107 calculates the center-of-gravity position and area of the first area A1 to detect the touch position and touch area of the operating tool M.

Specifically, the operating tool detector 107 specifies the long axis direction D of the first area A1 thereby to detect the pointing direction of the operating tool M. The pointing direction of the operating tool M is defined as a direction to point out the upper part of the display panel 101 in the long axis direction D of the first area A1. The controller 115 calculates an angle difference between pointing directions of the operating tool M before and after rotation thereby to calculate the rotational angle of the operating tool M.

Figure 3A:
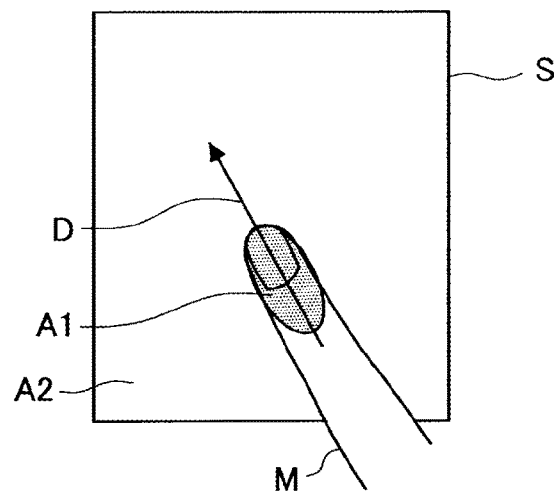
FIG. 3A is a view illustrating a detection result of an operating tool and a position of the operating tool on a display panel.
Figure 3B:
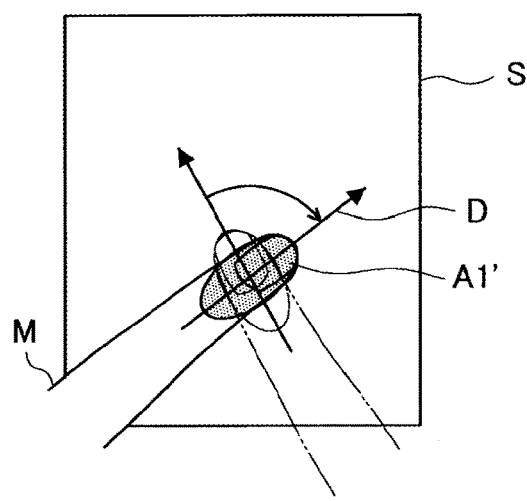
FIG. 3B is a view illustrating a detection result of an operating tool and a position of the operating tool on a display panel.
Figure 3C:
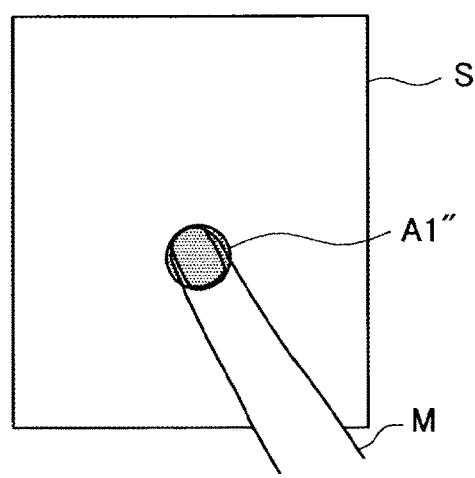
FIG. 3C is a view illustrating a detection result of an operating tool and a position of the operating tool on a display panel.

The following description is made about the method for detecting the pointing direction of the operating tool M with reference to FIGS. 3A to 3C. FIGS. 3A to 3C are views showing detection results of the operating tool M and the positions of the operating tool M on the display panel 101.

In FIG. 3A, the touch area A1 of the finger end as the operating tool M is grasped as the elliptic area A1 on the sensor image S. In this case, the operating tool detector 107 specifies the long axis direction D of the elliptic area A1 and detects the direction indicating the upper part of the display panel 101 along the specified long axis direction D as the pointing direction of the operating tool M. Typically, the touch area A1 of the finger end with the display panel 101 is grasped as an elliptic area A1 in which the finger pointing direction is the long axis direction D.

In FIG. 3B, the finger end is rotated from the state in FIG. 3A and the touch area A1' of the finger end after rotation is grasped on the sensor image S as an elliptic area A1'. In this case, the operating tool detector 107 specifies the long axis direction D of the elliptic area A1' and detects the direction indicating the upper part of the display panel 101 along the specified long axis direction D as the pointing direction of the operating tool M after rotation. Then, the controller 115 uses the angle difference of the pointing directions of the operating tool M before and after rotation as a basis to calculate the rotational angle of the operating tool M.

On the other hand, in FIG. 3C, a touch area A1" of the finger end is grasped as an approximately circular area A1" on the sensor image S. In this case, as the operating tool detector 107 may not specify the long axis direction D of the touch area A1", the controller 115 judges it as a detection error.

4. Map Information Display Method

Figure 4:
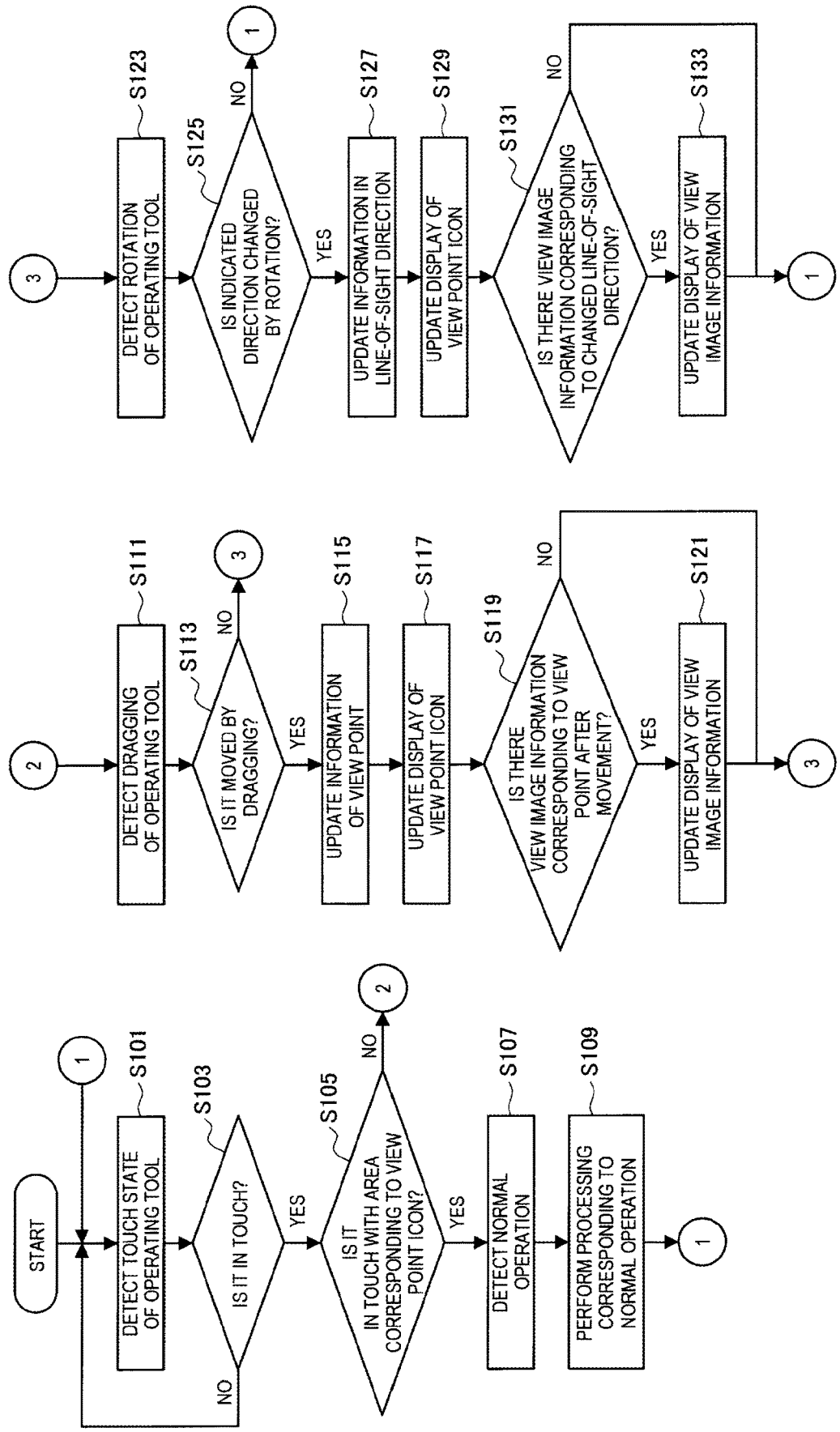
FIG. 4 is a flowchart illustrating a map information display method according to an embodiment of the present invention.
Figure 5:
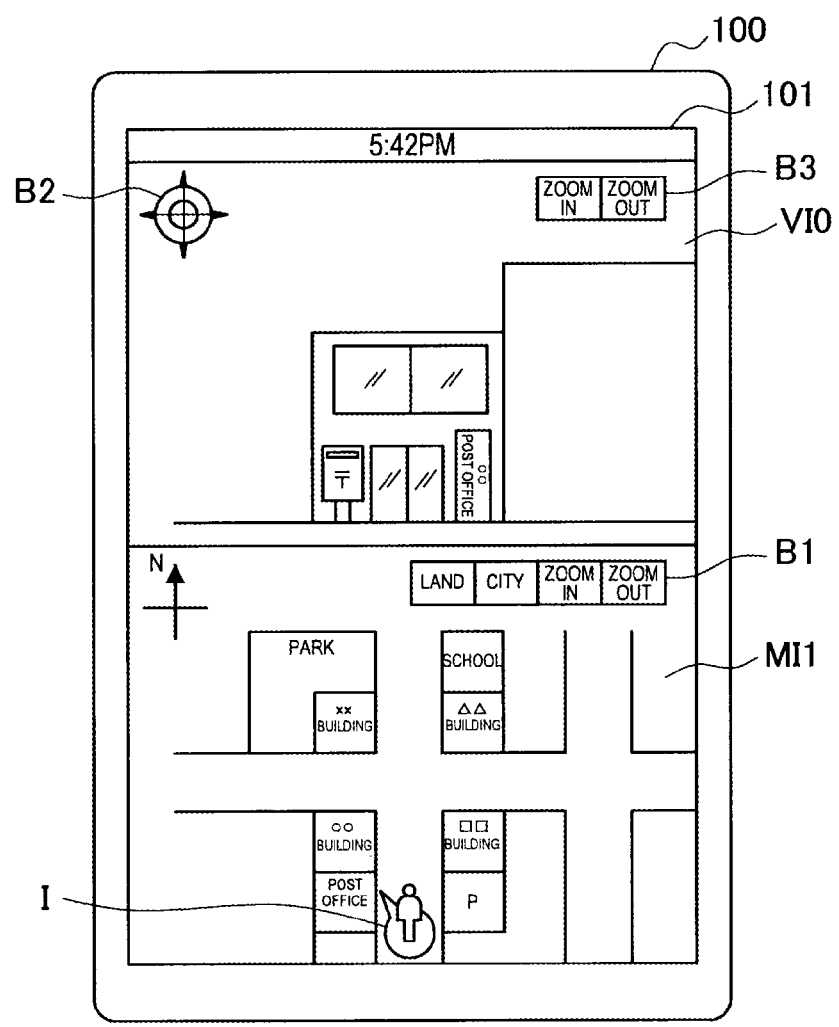
FIG. 5 is a view illustrating a display example of map information and view image information.
Figure 6:
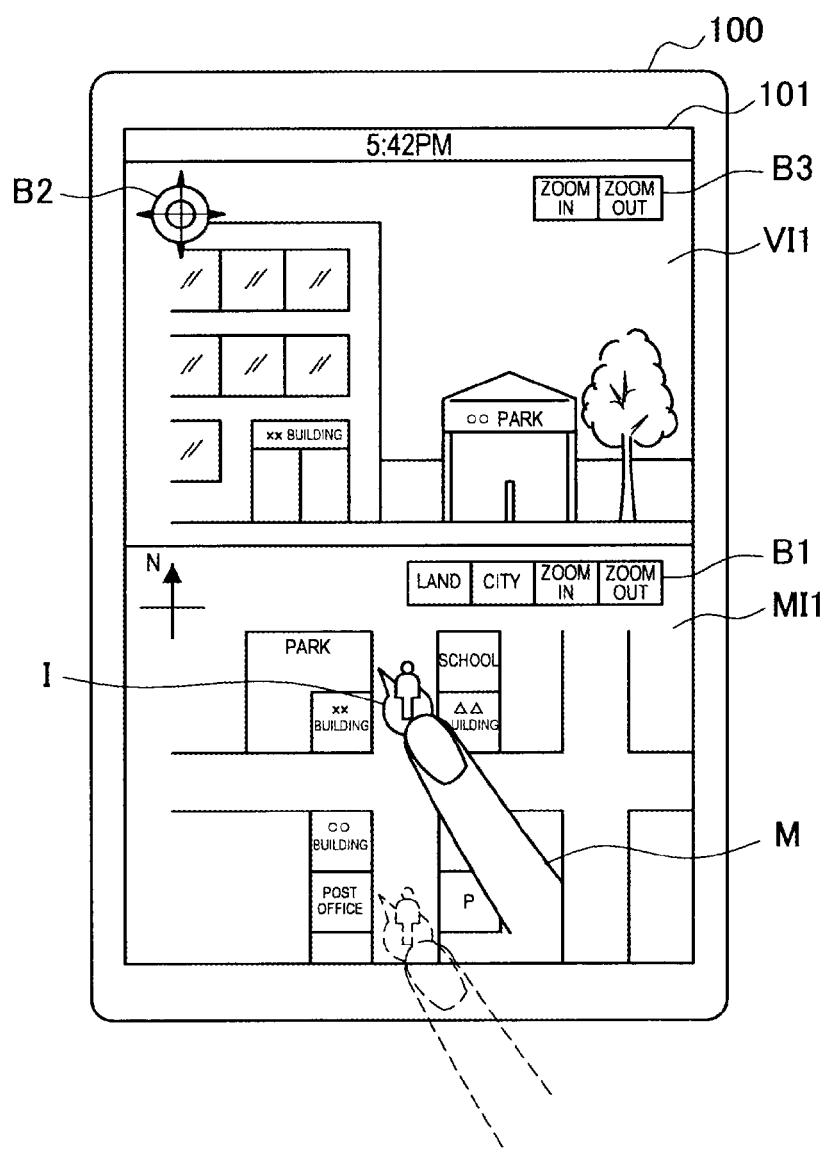
FIG. 6 is a view illustrating a display example of movement of the view point.
Figure 7:
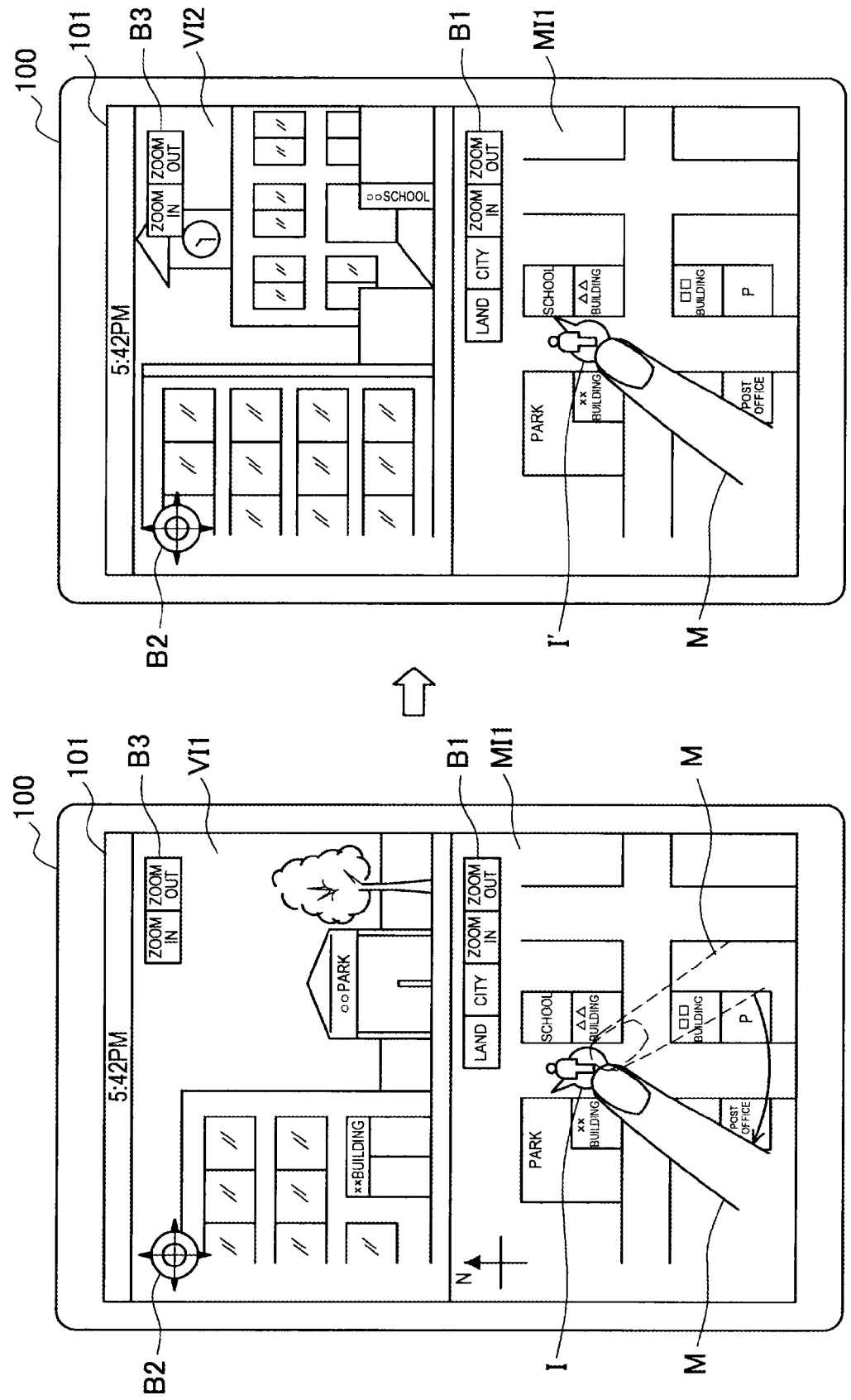
FIG. 7 is a view illustrating a display example of change in line-of-sight direction.

FIG. 4 is a flowchart illustrating the map information display method according to an embodiment of the present invention. FIG. 5 is a view illustrating a display example of the view image information VI and map information MI. FIG. 6 is a view illustrating a display example of movement of the view point. FIG. 7 is a view illustrating a display example of change of the line-of-sight direction.

In the display panel 101, the map information MI and the view image information VI in accordance with the view point and line-of-sight direction indicated on the map information MI are displayed. On the map information MI, the view point icon I indicating the indicated view point and line-of-sight direction (direction of arrow) is displayed at the position corresponding to the view point on the map information MI.

In the example illustrated in FIG. 5, the view image information VI0 (picture of postal office, etc.) corresponding to the line-of-sight direction (north-northwest direction) on the map information MI1 is displayed. Accordingly, the user can know the view point and line-of-sight direction on the map information MI1 easily.

In addition, on the map information MI1, a GUI button B1 and the like are displayed for selection of the map information MI and zooming in and out of the map information MI. Besides, on the view image information VI, GUI buttons B2 and B3 and the like are displayed for moving of the view image information VI and zooming in and out of the view image information VI.

As illustrated in FIG. 4, the operating tool detector 107 detects the touch state of the operating tool M per detection frame (step S101). The controller 115 determines whether the operating tool M is in touch with the display panel 101 or not (S103). When the determination result is positive, the controller 115 performs the processing of S105 and later, while, when the determination result is negative, it goes back to the processing of S101.

In step S105, the controller 115 determines whether the operating tool M is in touch with an area corresponding to the view point icon I or not. When the determination result is positive, the controller 115 performs the processing of step S107. When the determination result is negative, it performs the processing of step S111 and later.

In step S107, the operating tool detector 107 detects normal operations of click, drag, drop and flick on the map information MI or view image information VI in the subsequent frame. Then, the controller 115 performs processing corresponding to the detected operation (S109).

In step S111, the operating tool detector 107 detects dragging of the view point icon I by the operating tool M on the subsequent frame. Dragging means an operation of moving the operating tool M while it is in touch with an area corresponding to the view point icon I or the like on the display panel 101. The controller 115 determines whether or not the position of the operating tool M is moved from the last frame by dragging (S113). When the determination result is positive, the controller 115 performs processing of step S115 and later and, when the determination result is negative, the processing of step S123 and later is performed.

In step S115, the controller 115 updates information of the view point in accordance with the position of the moved operating tool M. The display controller 111 controls the display panel 101 (display unit 105) to display the view point icon I at the position of the moved operating tool M (S117).

In accordance with the moved view point, the controller 115 inquires the storage 113 about the presence of the view image information VI corresponding to the latitude, longitude and direction of the map information (S119), and when there exists the corresponding view image information VI, it instructs the image generator 109 to update the view image information VI. The image generator 109 reads from the storage 113 the view image information VI corresponding to the moved view point, generates the image data and outputs it to the display controller 111 so that the display of the view image information VI is updated on the display panel 101 (S121).

As illustrated in FIG. 6, when the position of the operating tool M is moved on the map information MI1 by dragging, the view point icon I is displayed on the position of the moved operating tool M. Then, if the view image information VI corresponding to the moved view point exists, display of the view image information VI is updated. In the example illustrated in FIG. 6, the view icon I is moved in the north direction and the view image information VI1 (picture of xx building, park and the like) corresponding to the line-of-sight direction (north-northwest direction) is displayed.

Here, if there exists view image information VI corresponding to respective view points on the moving track in accordance with the continuous movement of the position of the operating tool M, display of the view image information VI may be updated sequentially on the moving track. For example, in the example illustrated in FIG. 6, the pictures of the postal office, the OO building, the point of intersection, the xx building and the park may be displayed sequentially as view image information VI in accordance with movement of the view point.

In step S123, the operating tool detector 107 detects rotation of the view point icon I by the operating tool M on the following frame. The controller 115 determines whether or not the pointing direction of the operating tool M is changed from that in the last frame by rotation (S125). When the determination result is positive, the controller 115 performs the processing of step S127 and later, while when the determination result is negative, it goes back to step S101.

In step S127, the controller 115 updates the information in the line-of-sight direction in accordance with the pointing direction of the changed operating tool M. Here, the controller 115 updates the line-of-sight direction on the map information MI to match the pointing direction of the operating tool M. The display controller 111 controls the display panel 101 (display unit 105) to display the view point icon I that indicates the changed pointing direction of the operating tool M (S129).

The controller 115 inquires the storage 113 about existence of the view image information VI corresponding to the latitude, longitude and direction of the map information MI in accordance with the changed line-of-sight direction (S131), and when there exists the corresponding view image information VI, it instructs the image generator 109 to update the view image information VI. The image generator 109 reads the view image information VI corresponding to the changed line-of-sight direction from the storage 113, generates the image data and outputs it to the display controller 111 so that display of the view image information VI is updated on the display panel 101 (S133).

As illustrated in FIG. 7, when the pointing direction of the operating tool M is changed by 60° clockwise rotation on the view point icon I, the view point icon I' indicating the 60° clockwise changed line-of-sight direction is displayed. Here, the view point icon I' indicates the changed line-of-sight direction on the map information MI1 that matches the pointing direction of the operating tool M.

Then, if there exists the view image information VI corresponding to the changed line-of-sight direction, the display of the view image information VI is updated. In the example illustrated in FIG. 7, the view image information VI1 (picture of xx building, park etc.) and the view image information VI2 (picture of ΔΔ building, school etc.) corresponding to the line-of-sight directions (north-northwest and north-northeast directions) are displayed as information before and after change in line-of-sight direction. Accordingly, as the line-of-sight direction on the map information MI matches the pointing direction of the operating tool M, the user can intuitively indicate the line-of-sight direction on the map information MI.

Here, if in accordance with continuous change of the pointing direction of the operating tool M, there exists the view image information VI corresponding to each line-of-sight direction during change, display of the view image information VI may be updated sequentially during change.

For example, in the example of FIG. 7, in change of the line-of-sight direction, the picture of the xx building, the picture of the park, the picture of the road, the picture of the school and the picture of the ΔΔ building may be displayed sequentially as view image information VI.

Here, when the view image information VI does not exist corresponding to the changed line-of-sight direction or the moved view point, there is no need to update display of the view image information VI. Alternatively, predetermined image information may be displayed.

Besides, in the above description, rotation is detected after dragging of the operating tool M, however, dragging may be detected after detection of the rotation. With this configuration, movement of the operating tool M is detected almost simultaneously with detection of the pointing direction of the operating tool M, and then, the user can operate the change of the position of the view point and change of the line-of-sight direction on the map information MI continuously and easily.

5. Modifications

Figure 8:
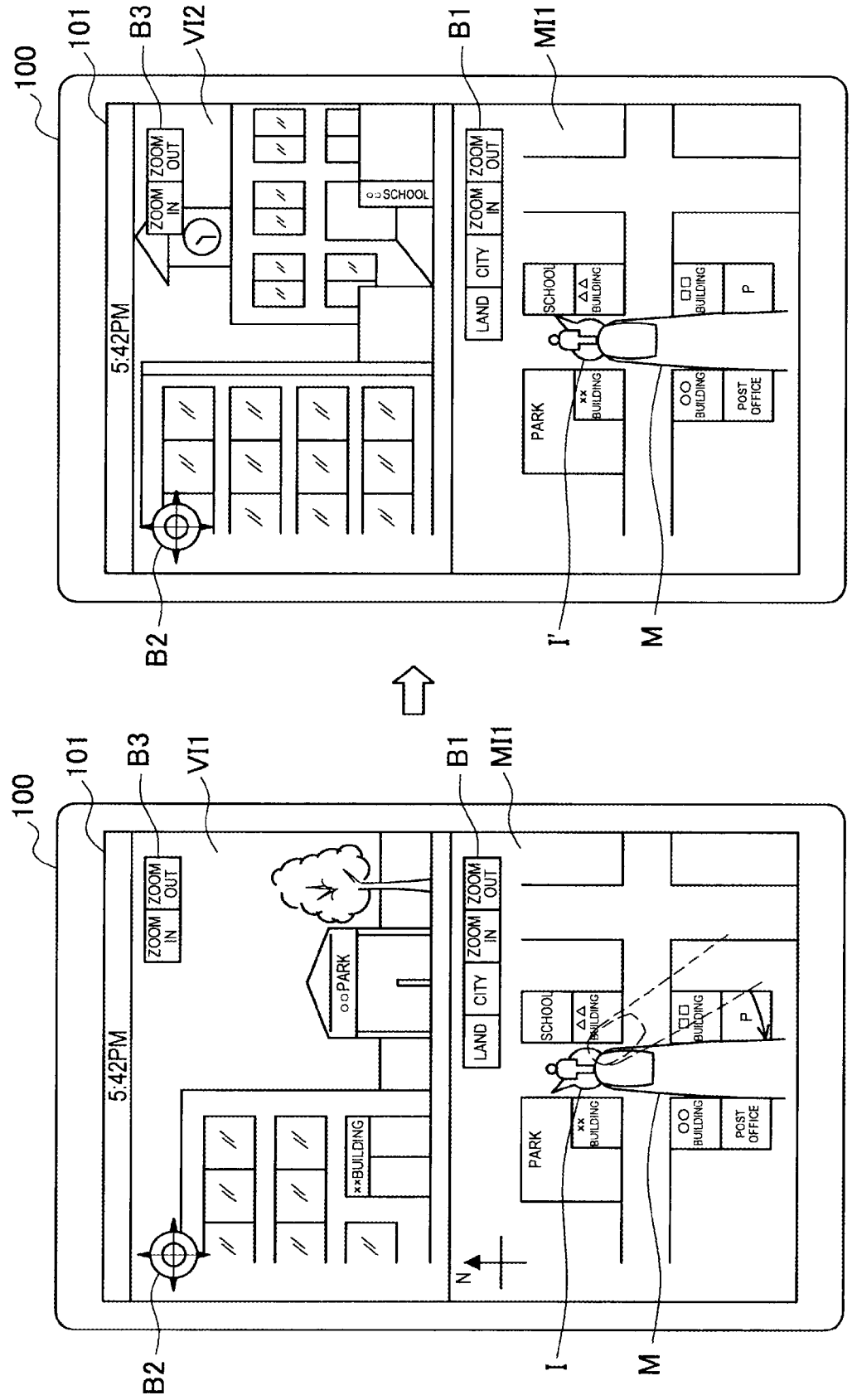
FIG. 8 is a view illustrating a first modification of the map information display.
Figure 9:
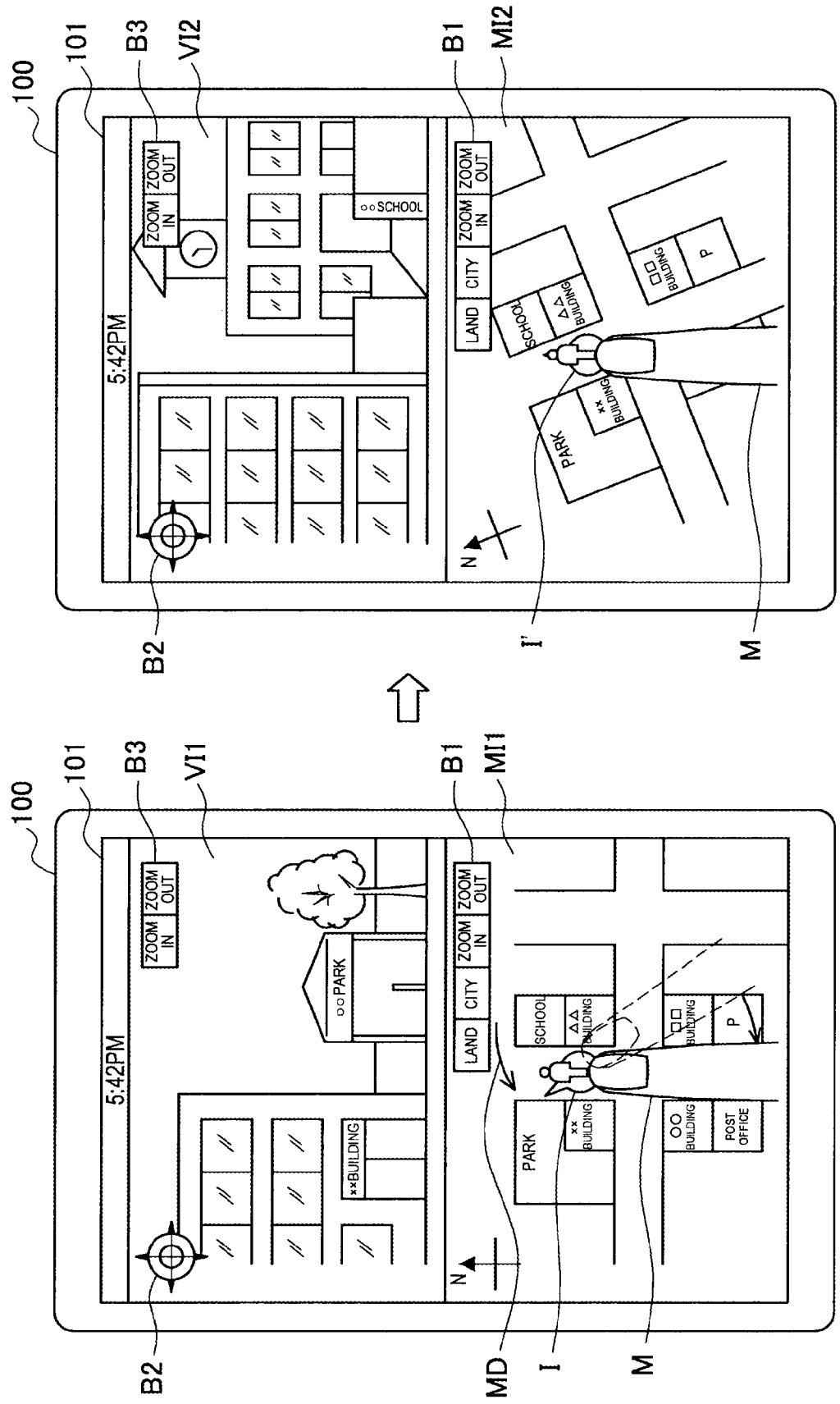
FIG. 9 is a view illustrating a second modification of the map information display.
Figure 10:
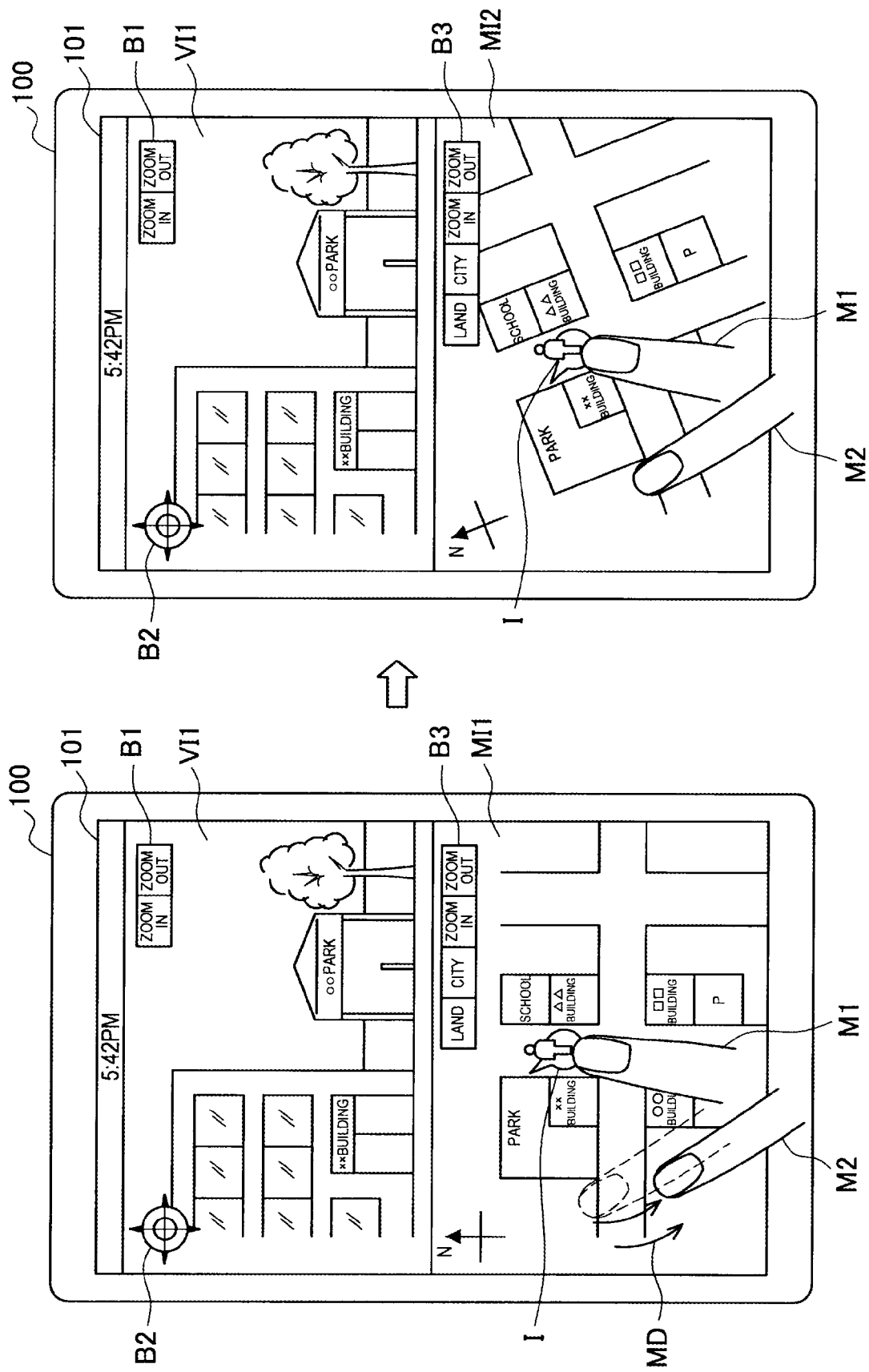
FIG. 10 is a view illustrating a third modification of the map information display.

FIGS. 8 to 10 are views illustrating first to third modifications of the map information display.

In the above-described embodiment, the line-of-sight direction on the map information MI matches the pointing direction of the operating tool M. In this case, the change range of the pointing direction of the operating tool M is restricted and sometimes the operability of rotation may be deteriorated. For example, usually, there is some difficulty in 180° rotating of the pointing direction of the finger as the operating tool M.

Therefore, in the first modification, display of the view image information VI is controlled in accordance with the line-of-sight direction defined by a change amount obtained by multiplying a change amount in the pointing direction of the operating tool M by a coefficient a (1< a), not the line-of-sight direction that matches the pointing direction of the operating tool M.

For example, when the coefficient a=2 is given, and as illustrated in FIG. 8, the pointing direction of the operating tool M on the view point icon I is changed by 30° clockwise rotation, the view point icon I' indicating the line-of-sight direction changed 60° clockwise (30°×2) is displayed and the view image information VI2 corresponding to the changed line-of-sight direction is displayed.

With this configuration, as the line-of-sight direction on the map information MI is defined by a change amount obtained by multiplying a change amount of the pointing direction of the operating tool M by the coefficient a (1< a), the user can easily indicate the line-of-sight direction on the map information MI even with slight change in the pointing direction. However, in the first modification, as the pointing direction does not match the line-of-sight direction, it is sometimes difficult to indicate the line-of-sight direction by intuitive operation.

Therefore, in a second modification, the line-of-sight direction is specified that is defined by a change amount obtained by multiplying a change amount in the pointing direction of the operating tool M by the coefficient a (1< a) and the map information MI is rotated by a change amount obtained by multiplying the change amount in the pointing direction of the operating tool M by a coefficient (1−a).

For example, when the coefficient a=2 is given, as illustrated in FIG. 9, the pointing direction of the operating tool M is changed 30° clockwise on the view point icon I by rotation, and as illustrated by the arrow MD, the map information MI is rotated −30° clockwise (=30°×(−1)) or 30° counterclockwise. Then, the view point icon I' indicating the line-of-sight direction changed 60° clockwise relative to the map information MI1 is displayed and the view image information VI2 corresponding to the changed line-of-sight direction is displayed.

Here, as the pointing direction of the operating tool M is changed 30° clockwise and the map information MI1 is changed to the map information MI2 by 30° counterclockwise rotation, the pointing direction of the operating tool M may be identical to the line-of-sight direction on the map information MI2.

With this configuration, as compared with the case when the view image information VI is displayed corresponding to the line-of-sight direction on the map information MI defined with the change amount obtained by multiplying the change amount in the pointing direction by the coefficient a, the user can indicate the line-of-sight direction on the map information MI intuitively.

In the second modification, the line-of-sight direction on the map information MI and the display direction of the map information MI are changed in accordance with change in the pointing direction of the operating tool M. However, in the second modification, the line-of-sight direction on the map information MI is also changed with the display direction of the map information MI, and display of the view image information VI is also changed. On the other hand, the user may sometimes desire change of the display direction of the map information MI while keeping display of the view image information VI.

Therefore, in a third modification, there is proposed an operation to change the display direction of the map information MI with use of the first and second operating tools M1 and M2. Here, the first operating tool M1 and the second operating tool M2 correspond, for example, to second and first fingers of the user or the first finger and thumb of the user.

As illustrated in FIG. 10, while the view point icon I is indicated by the first operating tool M1 which is, for example, second finger, the second operating tool M2, which is the first finger, is moved on the display panel 101 in such a manner as to draw an arc on the map information MI1. Here, if the arc is drawn 30° counterclockwise, the 30° counterclockwise rotated map information MI2 is displayed as illustrated by the arrow MD. Here, like in the first modification, the display direction of the map information MI1 may be changed by the change amount obtained by multiplying the change amount in pointing direction of the second operating tool M2 with the coefficient of 1 or more. Accordingly, the user can change the display direction of the map information MI while keeping display of the view image information VI.

In addition, change in display direction of the map information MI may be combined with change methods of the line-of-sight direction described with reference to FIGS. 7 to 9. With this configuration, the user can change the line-of-sight direction on the map information MI and change the display direction on the map information MI sequentially and easily.

6. Conclusion

As described above, according to the embodiments of the present invention, the map information display device 100 detects, on the display panel 101 on which the map information MI and the view image information VI are displayed, the position and the pointing direction of the operating tool M in touch with the area corresponding to the map information MI. Then, the map information display device 100 controls display of the view image information VI in accordance with the view point on the map information MI indicated by the position of the operating tool M and the line-of-sight direction on the map information MI indicated by the pointing direction of the operating tool M.

Accordingly, as the view image information VI in accordance with the view point and the line-of-sight direction indicated by the position and pointing direction of the operating tool M is displayed on the map information MI, the user can operate the map information MI and map related information such as view image information VI intuitively and easily.

It should be understood by those skilled in the art that various modifications, combinations, sub-combinations and alterations may occur depending on design requirements and other factors insofar as they are within the scope of the appended claims or the equivalents thereof.

For example, in the above-mentioned embodiments, the optical-type touch sensor 103 is used to detect the touch state of the operating tool M. However, the sensor may be an electric capacitance sensor, a pressure sensor or any other touch sensor.

For example, in the above-mentioned embodiments, the pointing direction of the operating tool M is detected based on the touch state of the operating tool M. However, the pointing direction of the operating tool M may be detected based on the touch state and proximity state of the operating tool M. In this case, for example, sensor image as an output result of a touch/proximity sensor may be processed into three values and the touch area, proximity area and non-touch proximity area of the operating tool M may be specified. Then, the gravity center positions of the proximity area and touch area may be used as a basis to detect a direction toward the center of gravity of the touch area from the center of gravity of the proximity area as the pointing direction of the operating tool M.

What is claimed is:

1. An information processing apparatus comprising:
   an acquisition unit configured to acquire a result of detection of a finger position and a finger pointing direction of a finger in a display of a first display area, wherein the finger pointing direction acquired by the acquisition unit is based on a direction of a long axis of a touch area of the finger on a touch detector; and
   a display control unit configured to:
   control display of first image view information on the first display area;
   control display of second image view information corresponding to the finger position and the finger pointing direction in the first image view information on a second display area; and
   change the display of the second image view information in response to a change of the detected finger position and a line-of-sight direction indicated by the detected finger pointing direction in the first display area, wherein a view direction in the second display area is based on the detected finger pointing direction in the first display area.

2. The information processing apparatus according to claim 1, wherein the display control unit is configured to display an icon having a pointing indicator which indicates the finger pointing direction.

3. The information processing apparatus according to claim 1, wherein the acquisition unit is configured to acquire the result of detection of the finger position and the finger pointing direction on a touch screen.

4. An information processing method, comprising:
   acquiring, by an acquisition unit, a result of detection of a finger position and a finger pointing direction of a finger in a display of a first display area, wherein the finger pointing direction acquired by the acquisition unit is based on a direction of a long axis of a touch area of the finger on a touch detector;
   controlling, by a display control unit, display of first image view information on the first display area;
   controlling, by the display control unit, display of second image view information corresponding to the finger position and the finger pointing direction in the first image view information on a second display area; and
   changing the display of the second image view information in response to a change of the detected finger position and a line-of-sight direction indicated by the detected finger pointing direction in the first display area, wherein a view direction in the second display area is based on the detected finger pointing direction in the first display area.

5. The information processing method according to claim 4, wherein the display control unit is configured to display an icon having a pointing indicator which indicates the finger pointing direction.

6. The information processing method according to claim 4, wherein the finger position and the finger pointing direction are detected on a touch screen.

7. A non-transitory computer-readable storage device encoded with computer-executable instructions that, when executed by a processing device, perform an information processing method comprising:
   acquiring a result of detection of a finger position and a finger pointing direction of a finger in a display of a first display area, wherein the finger pointing direction acquired by the acquisition unit is based on a direction of a long axis of a touch area of the finger on a touch detector;
   controlling display of first image view information on the first display area;
   controlling display of second image view information corresponding to the finger position and the finger pointing direction in the first image view information on a second display area; and
   changing the display of the second image view information in response to a change of the detected finger position and a line-of-sight direction indicated by the detected finger pointing direction in the first display area, wherein a view direction in the second display area is based on the detected finger pointing direction in the first display area.

8. The non-transitory computer-readable storage device as defined in claim 7, wherein the finger position and the finger pointing direction are detected on a touch screen.

9. The information processing apparatus according to claim 1, wherein the acquisition unit is further configured to acquire a result of detection of a finger rotation and wherein the display control unit is further configured to control display of the image view information in response to the detected finger rotation.

10. The information processing method according to claim 4, wherein acquiring further includes acquiring a result of detection of a finger rotation and wherein controlling display of image view information further includes controlling display of the image view information in response to the detected finger rotation.

11. The non-transitory computer-readable storage device as defined in claim 7, wherein acquiring further includes acquiring a result of detection of a finger rotation and wherein controlling display of image view information further includes controlling display of the image view information in response to the detected finger rotation.

12. The information processing apparatus according to claim 1, wherein the display control unit controls display of the second image view information based on a change amount obtained by multiplying a change amount in the finger movement on the first display area.

13. The information processing apparatus according to claim 12, wherein the display control unit controls display of the second image view information based on a change amount obtained by multiplying a change amount in the finger pointing direction.

14. The information processing apparatus according to claim 13, wherein the display control unit controls display of the second image view information based on a change amount obtained by multiplying a change amount in the finger pointing direction by a coefficient (1−a).

15. The information processing apparatus according to claim 13, wherein the display control unit controls display of the second image view information based on a change amount obtained by multiplying a change amount in the finger pointing direction by a coefficient larger than 1.

16. The information processing apparatus according to claim 13, wherein the change of the finger pointing direction is a dragging.

17. The information processing apparatus according to claim 1, wherein the display control unit controls display of the second image view information based on a change amount obtained by multiplying a change amount in the finger position and finger pointing direction.

* * * * *